United States Patent
Mchatet

(10) Patent No.: US 9,709,218 B1
(45) Date of Patent: Jul. 18, 2017

(54) COMPUTER SUCTION MOUNTING BASE ASSEMBLY

(71) Applicant: Hamid Mchatet, Miami, FL (US)

(72) Inventor: Hamid Mchatet, Miami, FL (US)

(*) Notice: Subject to any disclaimer, the term of this patent is extended or adjusted under 35 U.S.C. 154(b) by 0 days.

(21) Appl. No.: 15/150,846

(22) Filed: May 10, 2016

(51) Int. Cl.
*F16M 13/02* (2006.01)
*F16B 47/00* (2006.01)
*G06F 1/16* (2006.01)
*F16B 1/00* (2006.01)

(52) U.S. Cl.
CPC ........... *F16M 13/022* (2013.01); *F16B 47/00* (2013.01); *G06F 1/1633* (2013.01); *F16B 2001/0035* (2013.01)

(58) Field of Classification Search
CPC .................. F16M 13/022; F16B 47/00; F16B 2001/0035; G06F 1/1633
USPC ...................... 248/205.8, 205.5, 206.2, 206.5
See application file for complete search history.

(56) References Cited

U.S. PATENT DOCUMENTS

| | | | | |
|---|---|---|---|---|
| 6,234,435 B1* | 5/2001 | Yeh | ......................... | A45D 42/14 248/205.5 |
| 7,226,026 B2* | 6/2007 | Lin | ......................... | B60R 11/00 248/183.1 |
| 7,913,963 B2* | 3/2011 | Cheng | ..................... | B60R 11/02 248/205.5 |
| 2005/0044673 A1* | 3/2005 | Huang | ..................... | A47G 1/17 24/303 |
| 2015/0250065 A1* | 9/2015 | Hornick | ................. | H01R 13/73 248/206.2 |

* cited by examiner

*Primary Examiner* — Anita M King
(74) *Attorney, Agent, or Firm* — Albert Bordas, P.A.

(57) ABSTRACT

A computer suction mounting base assembly having a suction cup assembly, a base assembly, a disk assembly, and a mount assembly with a housing assembly. The housing assembly houses a magnet. Protruding upwardly from the disk assembly is an actuating sidewall defining an actuating pin locking edge, an actuating transitioning edge, and an actuating pin release edge. The mount assembly is rotated in a first predetermined direction to create a vacuum between the suction cup assembly and a surface the suction cup assembly is biased against. The housing assembly comprises at least one aperture. The magnet is larger than the at least one aperture. The magnet partially protrudes through the at least one aperture and adheres onto a magnetic material of a computer and/or computer cover when the computer and/or computer cover is mounted onto the housing assembly.

18 Claims, 7 Drawing Sheets

COMPUTER SUCTION MOUNTING BASE ASSEMBLY

BACKGROUND OF THE INVENTION

1. Field of the Invention

The present invention relates to computer mounting accessories, and more particularly, to suction mounting base assemblies for computers and electronic components.

2. Description of the Related Art

Applicant is not aware of any prior art suggesting the novel features of the present invention.

SUMMARY OF THE INVENTION

The present invention is a computer suction mounting base assembly, comprising a suction cup assembly, a base assembly, a disk assembly, and a mount assembly having a housing assembly. The housing assembly houses a magnet.

Protruding upwardly from the suction cup assembly is a post assembly. The post assembly comprises a spring and a pin. The pin extends through the post assembly.

The base assembly comprises a top wall and protruding upwardly from the top wall is a post housing having at least one slot for the pin to travel through. The base assembly comprises at least one elongated side channel. In a preferred embodiment, the at least one elongated side channel is on a sidewall of the base assembly. The base assembly comprises at least one slit. In a preferred embodiment, the at least one slit is at the top wall.

The mount assembly comprises at least one guide pin that travels within the at least one elongated side channel.

The disk assembly comprises at least one disk pin that travels within the at least one slit. Protruding upwardly from the disk assembly is an actuating sidewall defining an actuating pin locking edge, an actuating transitioning edge, and an actuating pin release edge.

The mount assembly mounts and is secured onto the disk assembly. The disk assembly mounts and is secured onto the base assembly. The mount assembly is rotated in a first predetermined direction to position the pin on the actuating pin locking edge to create a vacuum between the suction cup assembly and a surface the suction cup assembly is biased against. The mount assembly is rotated in a second predetermined direction to position the pin on the actuating release edge to lessen the vacuum between the suction cup assembly and the surface.

The housing assembly comprises at least one aperture. The magnet is larger than the at least one aperture. In a preferred embodiment, the magnet is spherical in shape. The magnet partially protrudes through the at least one aperture and adheres onto a magnetic material of a computer and/or computer cover when the computer and/or computer cover is mounted onto the housing assembly. The suction cup assembly comprises a tab.

It is therefore one of the main objects of the present invention to provide a computer suction mounting base assembly.

It is another object of this invention to provide a computer suction mounting base assembly that may be secured onto a surface.

It is another object of this invention to provide a computer suction mounting base assembly that is volumetrically efficient for carrying, transporting, and storage.

It is another object of this invention to provide a computer suction mounting base assembly that can be readily assembled and disassembled without the need of any special tools.

It is another object of this invention to provide a computer suction mounting base assembly, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
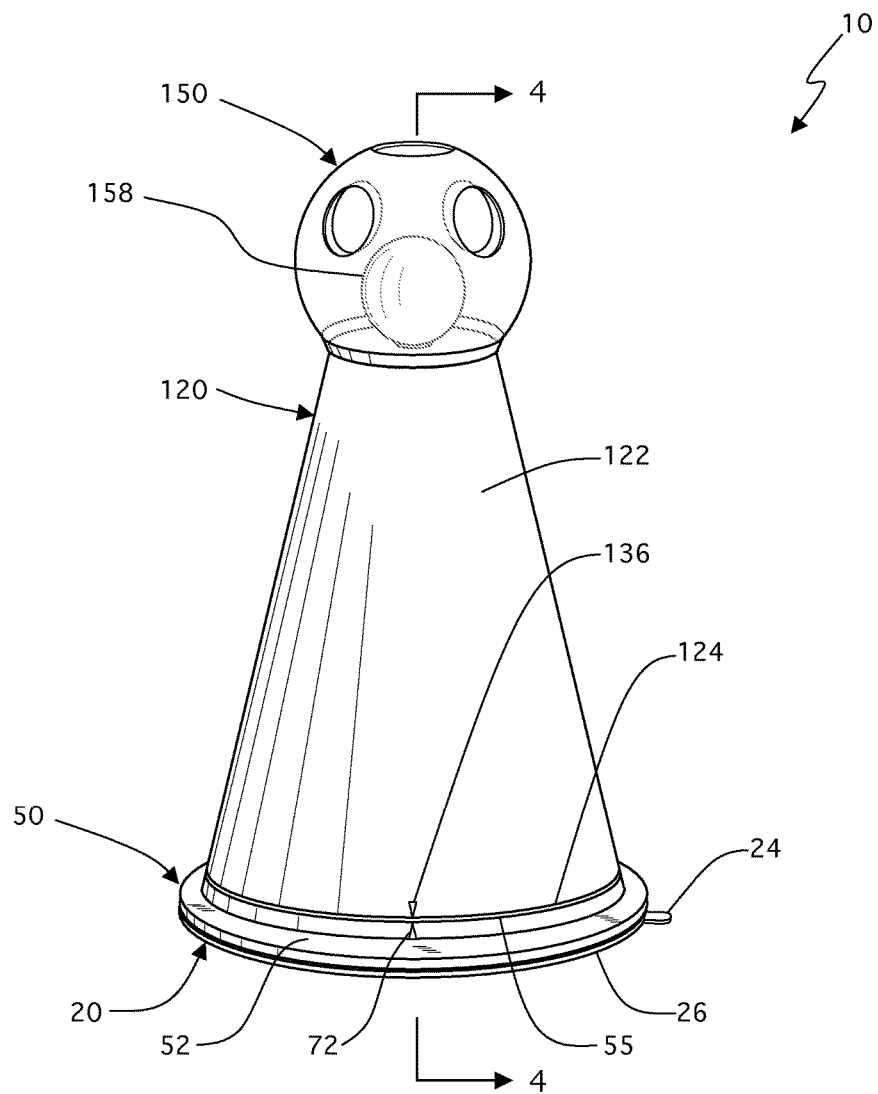
FIG. 1 represents an isometric view of a computer suction mounting base assembly in a closed configuration.

Referring now to the drawings, the present invention is generally referred to with numeral 10. It can be observed that it basically includes suction cup assembly 20, base assembly 50, disk assembly 90, and mount assembly 120 having housing assembly 150.

As seen in FIG. 1, present invention 10 comprises suction cup assembly 20, base assembly 50, and mount assembly 120 having housing assembly 150. In this illustration, present invention 10 is in a closed configuration, whereby indicator 136 of mount assembly 120 is aligned with indicator 72 of base assembly 50, and whereby base assembly 50 is biased against suction cup assembly 20.

Figure 2:
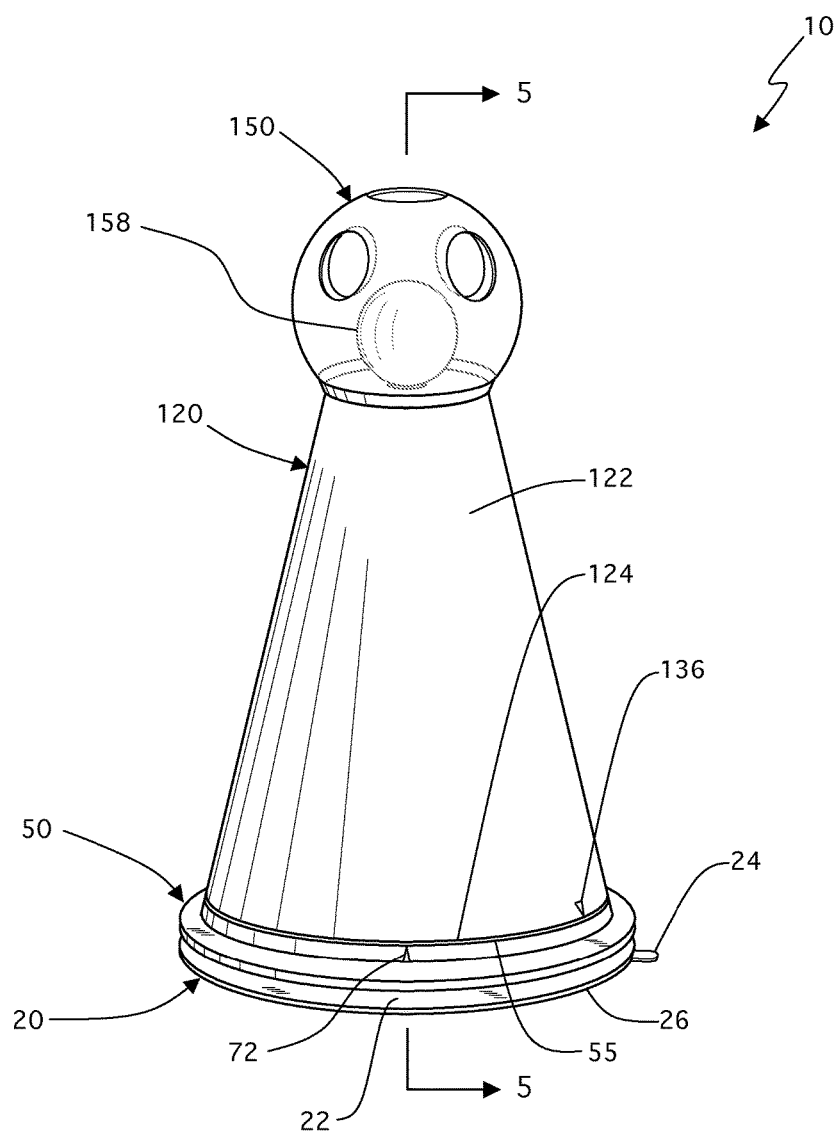
FIG. 2 represents an isometric view of the computer suction mounting base assembly in an open configuration.

As seen in FIG. 2, present invention 10 is in an open configuration, whereby indicator 136 of mount assembly 120 is not aligned with indicator 72 of base assembly 50, and whereby a gap exists between base assembly 50 and suction cup assembly 20.

Figure 3:
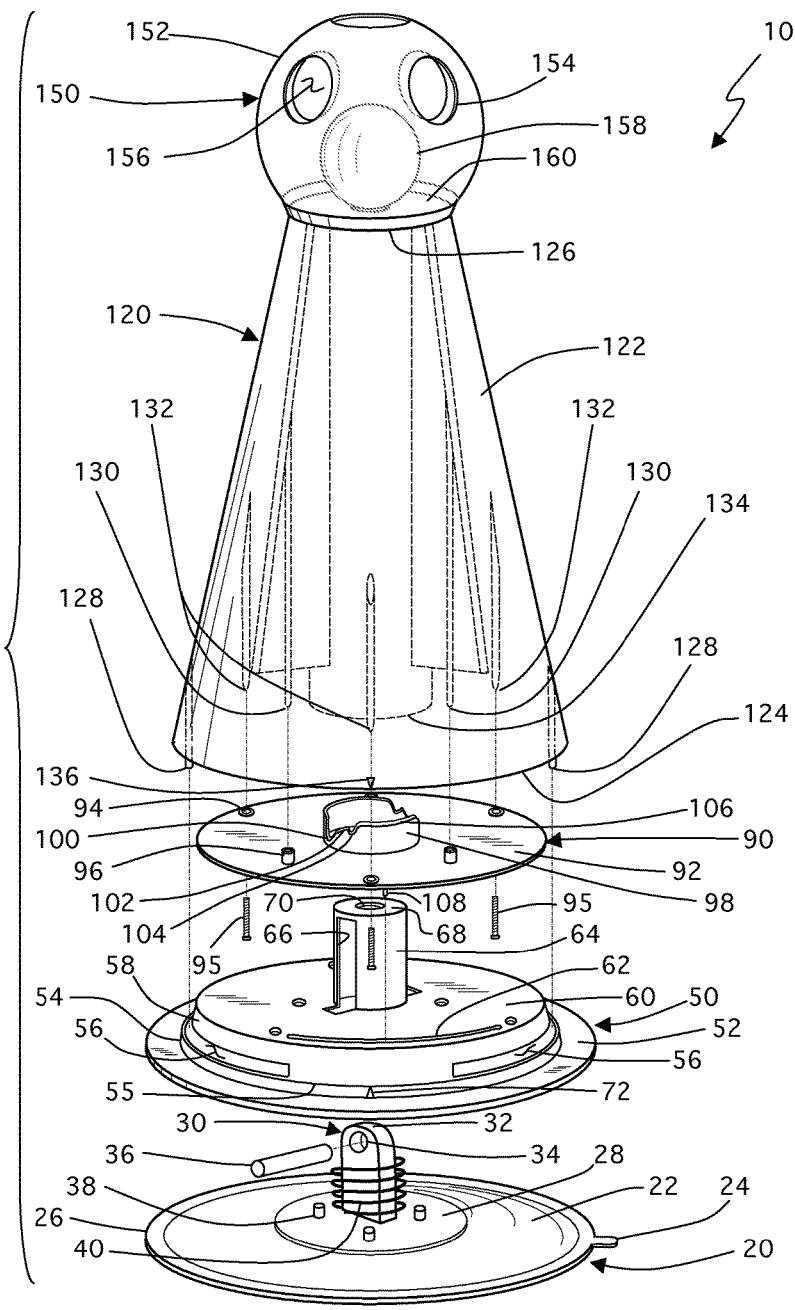
FIG. 3 is an exploded view of the computer suction mounting base assembly.

As seen in FIG. 3, suction cup assembly 20 comprises top face 22, bottom face 26, and tab 24 at an edge. A reinforced section of top face 22 is defined as over-layer 28. Suction cup assembly 20 houses post assembly 30 that protrudes upwardly therefrom, whereby post assembly 30 comprises mounting posts 38 that protrude through holes at over-layer 28 for stability. Post assembly 30 comprises post 32 having hole 34. Positioned around post 32 is spring 40. Post assembly 30 further comprises pin 36 that extends perpendicularly through post 32 at hole 34. It is noted that a length of pin 36 is longer than a thickness of post 32. In a preferred embodiment, suction cup assembly 20 is circular in shape.

Base assembly 50 comprises base 52. In a preferred embodiment, a first area defined by base 52 is approximately a same size or slightly smaller than a second area defined by bottom face 26 of suction cup assembly 20. Extending upwardly from base 52 is side edge 54 that extends to edge 55. Positioned on side edge 54 is indicator 72. Extending upwardly from edge 55 is sidewall 58 having at least one elongated side channel 56. In a preferred embodiment, sidewall 58 has first and second elongated side channels 56. Base assembly 50 further comprises top wall 60 having at least one slit 62. Protruding upwardly from top wall 60 is post housing 64 having at least one slot 66 for pin 36 to travel through. In a preferred embodiment, pin 36 travels vertically through slot 66. Post housing 64 also has top 68 having hole 70. In a preferred embodiment, base assembly 50 is circular in shape.

Disk assembly 90 mounts and is secured onto base assembly 50. Disk assembly 90 comprises disk 92 having at least one screw hole 94 and at least one alignment post 96. Screws 95 secure disk assembly 90 to mount assembly 120 at screw holes 132. Disk 92 further comprises at least one disk pin 108 that travels within slit 62. Protruding upwardly from disk 92 is actuating sidewall 98 defining actuating pin locking edge 100, actuating transitioning edge 102, actuating pin release edge 104, and top edge 106. In a preferred embodiment, actuating sidewall 98 is circular in shape and actuating pin locking edge 100, actuating transitioning edge 102, and actuating pin release edge 104 are sufficiently smooth to permit pin 36 to easily transition from actuating pin locking edge 100, to actuating transitioning edge 102, to actuating pin release edge 104, and vice versa. In a preferred embodiment, disk assembly 90 is circular in shape.

Mount assembly 120 mounts and is secured onto disk assembly 90. Mount assembly 120 comprises sidewall 122 that extends between top end 126 and bottom end 124. Mount assembly 120 further comprises alignment pins 130, screw holes 132, and aperture 134 that are positioned within an internal cavity defined by sidewall 122. Each alignment pin 130 aligns with its respective alignment post 96, and aperture 134 receives actuating sidewall 98 having post housing 64 inserted therethrough. Mount assembly 120 further comprises at least one guide pin 128 that travels within at least one elongated side channel 56. In a preferred embodiment, mount assembly 120 comprises first and second guide pins 128 that travel within their respective first and second elongated side channels 56. In a preferred embodiment, first and second guide pins 128 are positioned within a diameter defined by bottom end 124. In a preferred embodiment, mount assembly 120 is generally shaped as a cone.

Housing assembly 150 comprises housing 152 and housing base 160. Housing 152 has at least one aperture 154 and defines cavity 156 to contain magnet 158. In a preferred embodiment, magnet 158 is a magnetic sphere and is larger in size than an opening defined by aperture 154 so that magnet 158 does not completely fit through aperture 154 and a majority of magnet 158 thus remains within housing 152. In a preferred embodiment, housing assembly 150 is generally spherically shaped.

Figure 4:
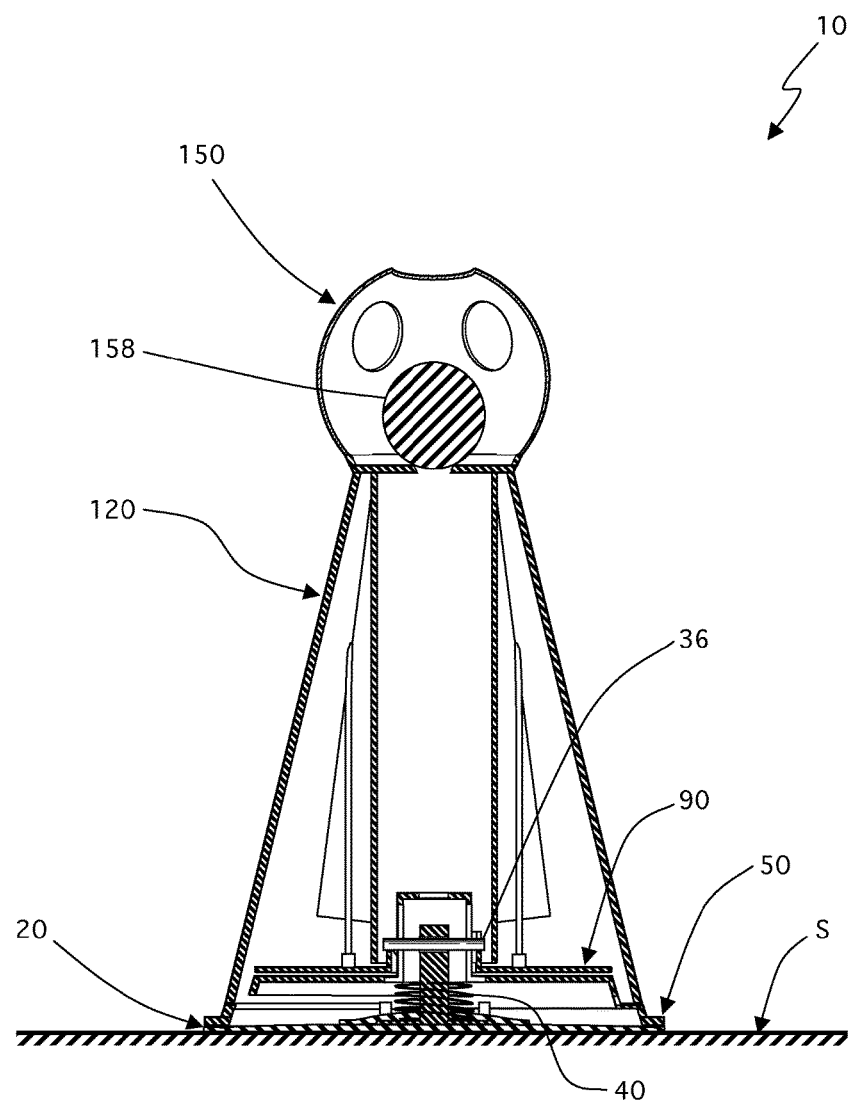
FIG. 4 is a cross-section view taken along lines 4-4 from FIG. 1.

As seen in FIGS. 3 and 4, mount assembly 120 is rotated in a first predetermined direction to position pin 36 on actuating pin locking edge 100, as base assembly 50 compresses spring 40, to force suction cup assembly 20 against surface S. This creates a vacuum between suction cup assembly 20 and surface S, whereby suction cup assembly 20 is biased against surface S.

Figure 5:
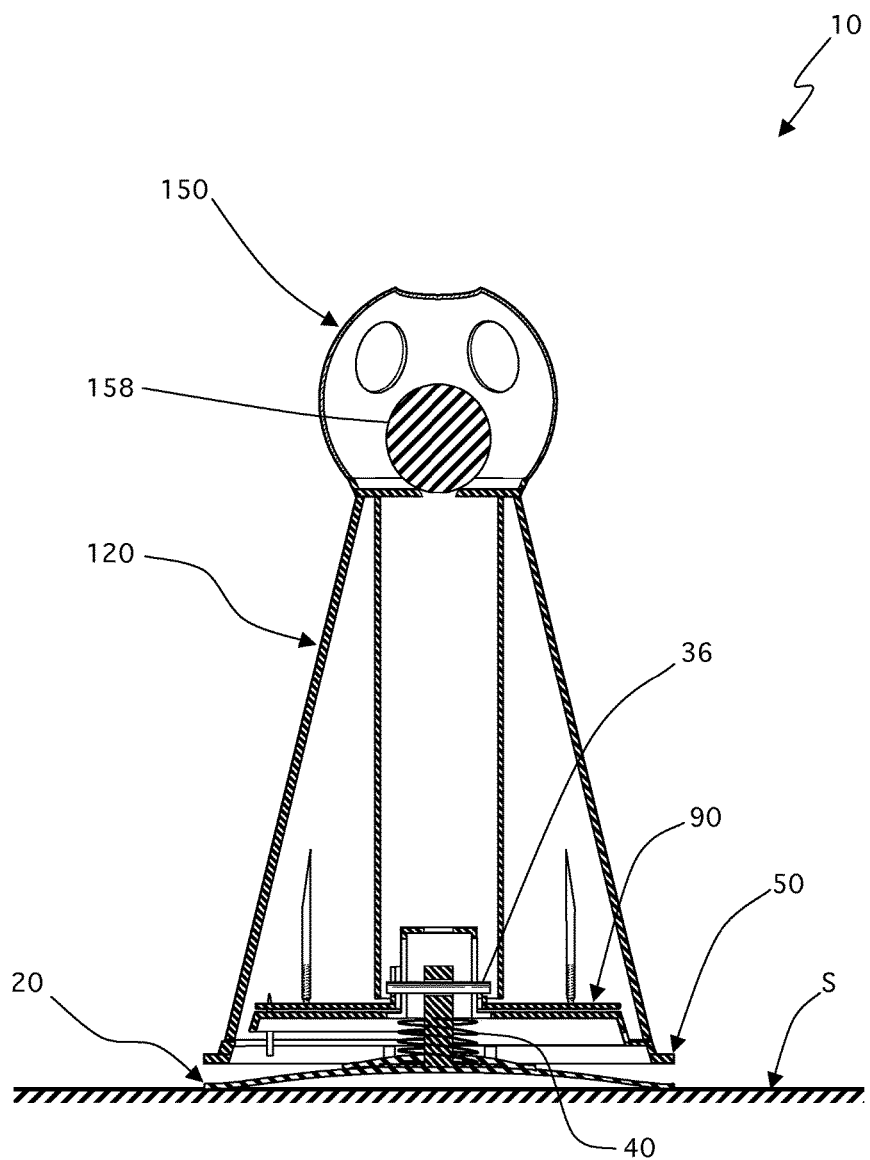
FIG. 5 is a cross-section view taken along lines 5-5 from FIG. 2.

As seen in FIGS. 3 and 5, mount assembly 120 is rotated in a second predetermined direction to position pin 36 on actuating release edge 104 to lessen the vacuum between suction cup assembly 20 and surface S. Tab 24 may be lifted to separate from surface S, thereby elevating a section of suction cup assembly 20, to remove present invention 10 from surface S.

Figure 6:
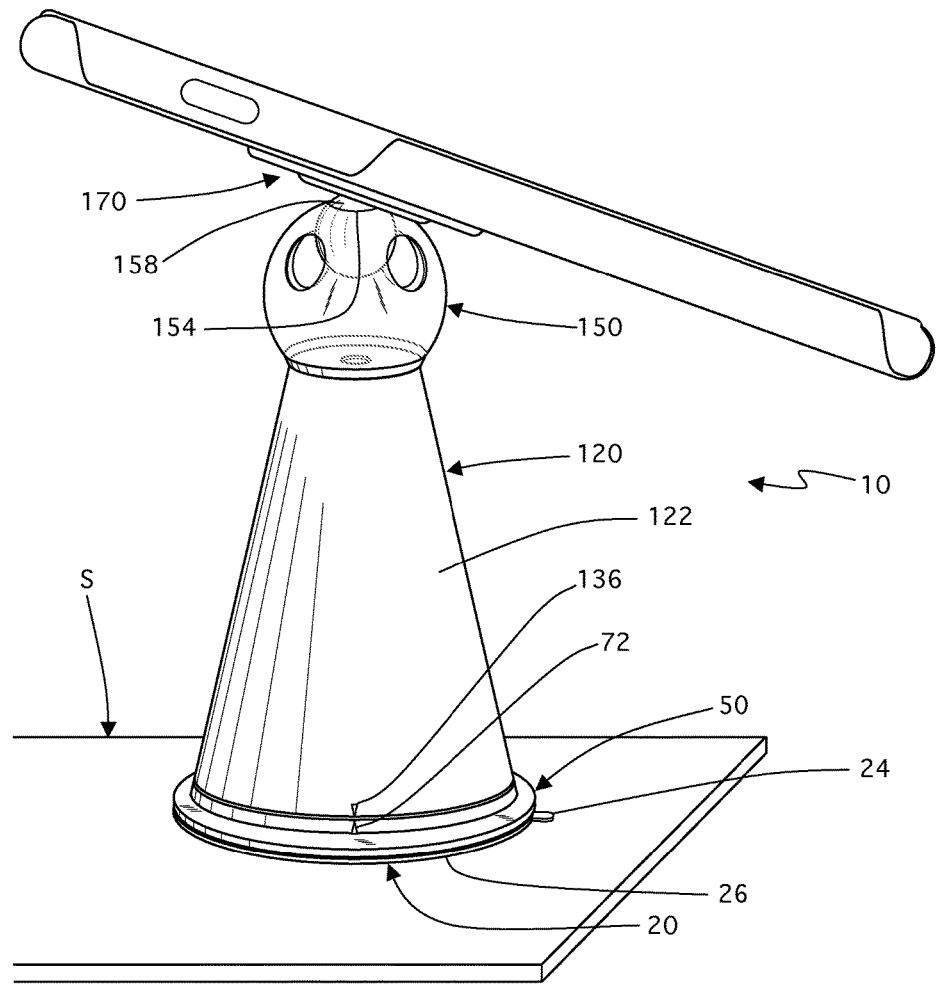
FIG. 6 represents an isometric view of a computer and cover mounted onto the computer suction mounting base assembly in the closed configuration and fixed onto a surface.

As seen in FIG. 6, computer and cover 170 are mounted onto present invention 10, and present invention 10 is in the closed configuration fixed onto surface S. More specifically, computer and cover 170 are mounted onto present invention 10 whereby magnet 158 partially protrudes through at least one aperture 154 and adheres onto a magnetic material of computer and cover 170. It is noted that either the computer and/or the cover of computer and cover 170 may comprise the magnetic material. The magnetic material is capable of being magnetized or attracted to magnet 158.

Figure 7:
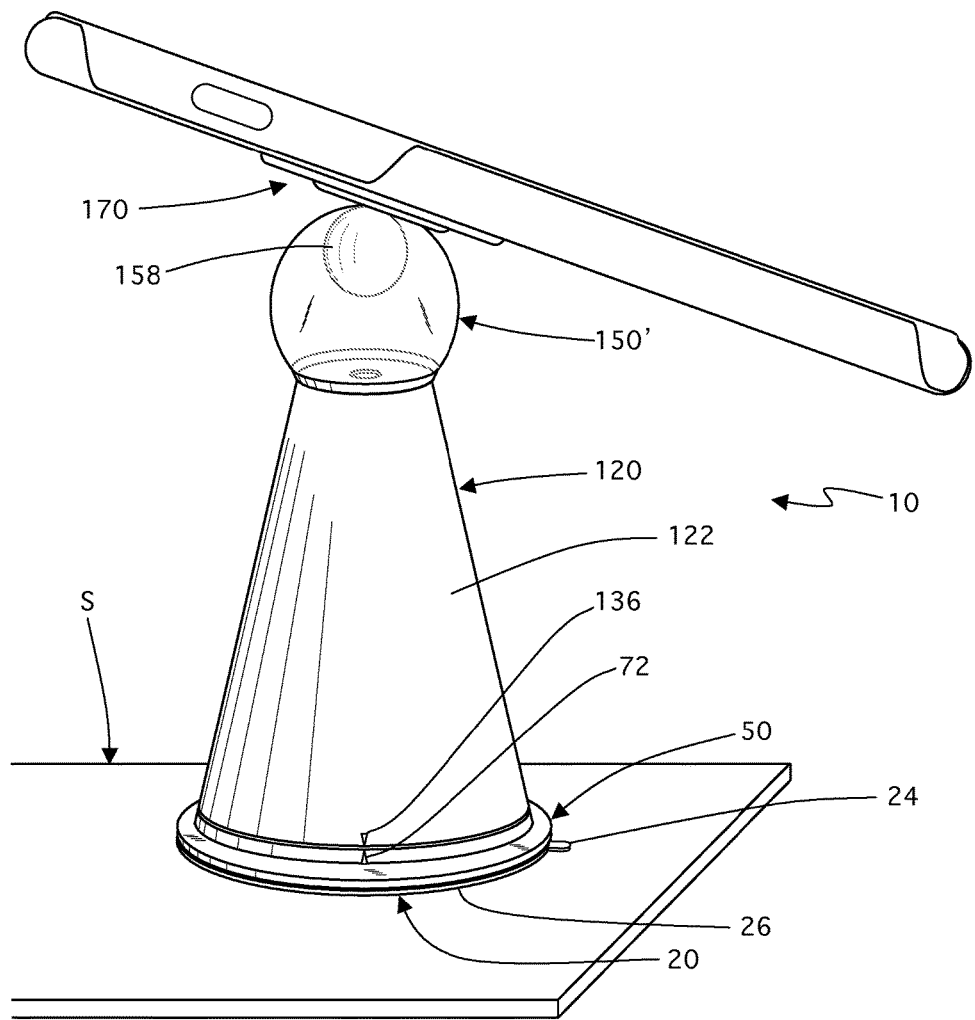
FIG. 7 represents a second isometric view of the computer and cover mounted onto the computer suction mounting base assembly in the closed configuration and fixed onto the surface with an alternate embodiment housing assembly.

As seen in FIG. 7, computer and cover 170 are mounted onto present invention 10, and present invention 10 is in the closed configuration fixed onto surface S. More specifically, computer and cover 170 are mounted onto present invention 10 whereby magnet 158 adheres onto a magnetic material of computer and cover 170 through alternate embodiment housing assembly 150'. It is noted that housing assembly 150 and alternate embodiment housing assembly 150' can be interchangeable.

The computer of computer and cover 170 may be, but is not limited to, a programmable electronic device designed to accept data, perform prescribed mathematical and logical operations at high speed, and display the results of these operations. In addition, the computer of computer and cover 170 is a mainframe, a desktop computer, a laptop computer, a tablet, a smartphone, a cell phone, a telephone, a personal digital device, an electronic apparatus, a computing apparatus, and/or a communications apparatus. The cover of computer and cover 170 may be, but is not limited to, any structure generally designed to protect or otherwise partially or fully cover the computer of computer and cover 170.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A computer suction mounting base assembly, comprising:
   A) a suction cup assembly, protruding upwardly from said suction cup assembly is a post assembly, said post assembly comprises a spring and a pin;
   B) a base assembly;
   C) a disk assembly, protruding upwardly from said disk assembly is an actuating sidewall defining an actuating pin locking edge, an actuating transitioning edge, and an actuating pin release edge; and
   D) a mount assembly having a housing assembly, said housing assembly housing a magnet.

2. The computer suction mounting base assembly set forth in claim 1, further characterized in that said pin extends through said post assembly.

3. The computer suction mounting base assembly set forth in claim 2, further characterized in that said base assembly comprises a top wall and protruding upwardly from said top wall is a post housing having at least one slot for said pin to travel through.

4. The computer suction mounting base assembly set forth in claim 3, further characterized in that said base assembly comprises at least one slit.

5. The computer suction mounting base assembly set forth in claim 4, further characterized in that said at least one slit is at said top wall.

6. The computer suction mounting base assembly set forth in claim 4, further characterized in that said disk assembly comprises at least one disk pin that travels within said at least one slit.

7. The computer suction mounting base assembly set forth in claim 1, further characterized in that said base assembly comprises at least one elongated side channel.

8. The computer suction mounting base assembly set forth in claim 7, further characterized in that said at least one elongated side channel is on a sidewall of said base assembly.

9. The computer suction mounting base assembly set forth in claim 7, further characterized in that said mount assembly comprises at least one guide pin that travels within said at least one elongated side channel.

10. The computer suction mounting base assembly set forth in claim 1, further characterized in that said mount assembly mounts and is secured onto said disk assembly.

11. The computer suction mounting base assembly set forth in claim 1, further characterized in that said disk assembly mounts and is secured onto said base assembly.

12. The computer suction mounting base assembly set forth in claim 1, further characterized in that said mount assembly is rotated in a first predetermined direction to position said pin on said actuating pin locking edge to create a vacuum between said suction cup assembly and a surface said suction cup assembly is biased against.

13. The computer suction mounting base assembly set forth in claim 12, further characterized in that said mount assembly is rotated in a second predetermined direction to position said pin on said actuating release edge to lessen said vacuum between said suction cup assembly and said surface.

14. The computer suction mounting base assembly set forth in claim 1, further characterized in that said housing assembly comprises at least one aperture.

15. The computer suction mounting base assembly set forth in claim 14, further characterized in that said magnet is larger than said at least one aperture.

16. The computer suction mounting base assembly set forth in claim 14, further characterized in that said magnet partially protrudes through said at least one aperture and adheres onto a magnetic material of a computer and/or computer cover when said computer and/or computer cover is mounted onto said housing assembly.

17. The computer suction mounting base assembly set forth in claim 1, further characterized in that said magnet is spherical in shape.

18. The computer suction mounting base assembly set forth in claim 1, further characterized in that said magnet adheres onto a magnetic material of a computer and/or computer cover when said computer and/or computer cover is mounted onto said housing assembly.

* * * * *